Patented Jan. 16, 1923.

1,442,558

UNITED STATES PATENT OFFICE.

FRANK COOK, OF SPOKANE, WASHINGTON, ASSIGNOR TO THE HOLT MANUFACTURING COMPANY, OF STOCKTON, CALIFORNIA, A CORPORATION OF CALIFORNIA.

LOG HAULER.

Application filed November 4, 1919. Serial No. 335,583.

*To all whom it may concern:*

Be it known that I, FRANK COOK, a citizen of the United States, residing at the city and county of Spokane and State of Washington, have invented new and useful Improvements in Log Haulers, of which the following is a specification.

This invention relates to log haulers and has for its object to provide a device of this kind suitable for use in forests where the ground is soft or covered with snow, said device being adapted to be towed behind a tractor and to be used either as a single unit or in tandem.

In the present invention I employ a pair of chain track truck mechanisms connected together by means of an axle and mount a bolster on the axle, said bolster extending upwardly above the level of the upper run of the chain tracks and being arranged to receive and support the logs. Draft connections are provided which serve also to stabilize the bolster. Where one unit only is used, the logs are rolled on to the bolster and supported thereon at their front ends, the rear ends of the logs trailing on the ground behind. Where two units are coupled together in tandem, the logs may be supported equally on both.

Referring to the accompanying drawings.

Figure 1:
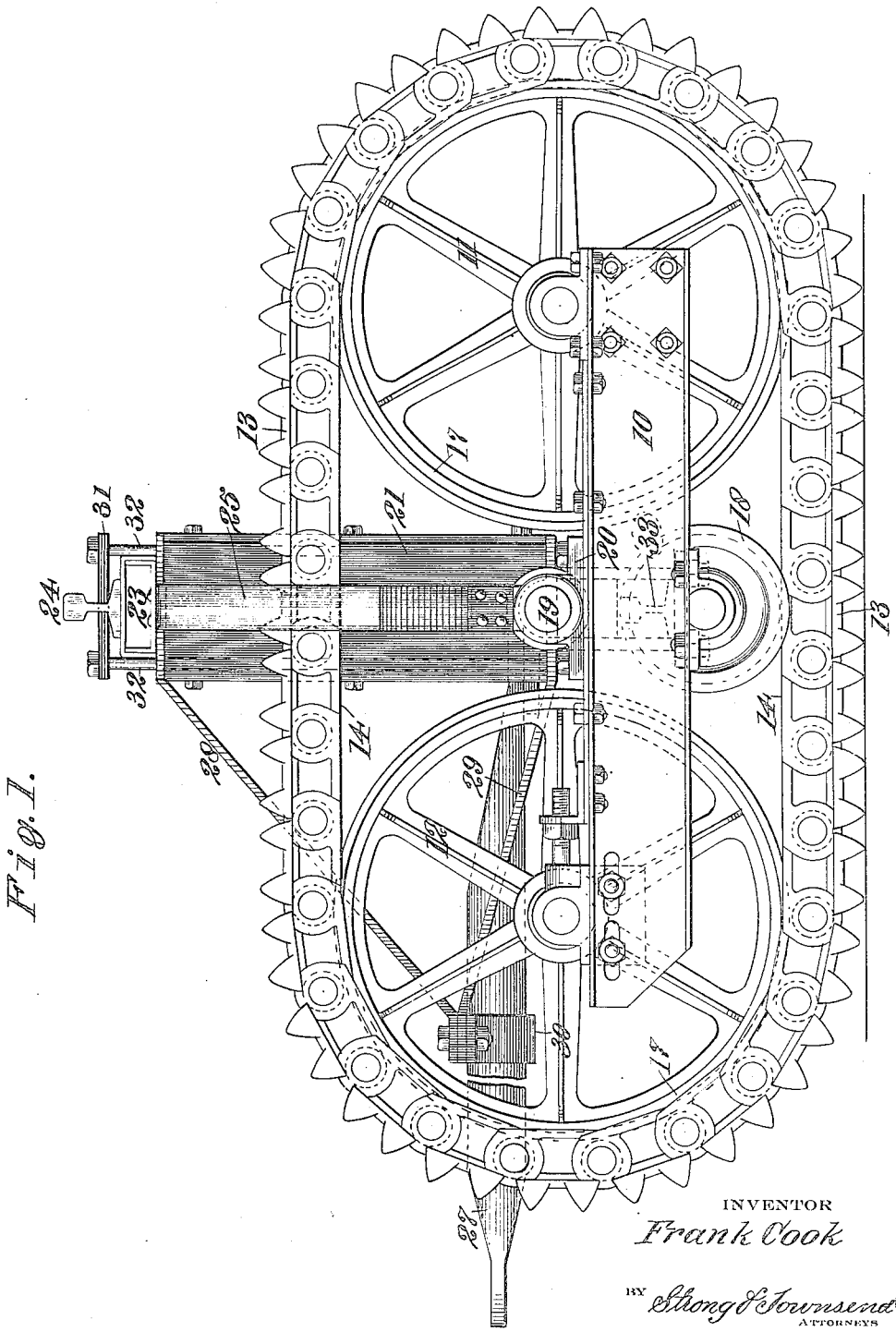
Fig. 1 shows a side elevation of a device embodying my invention.
Figure 2:
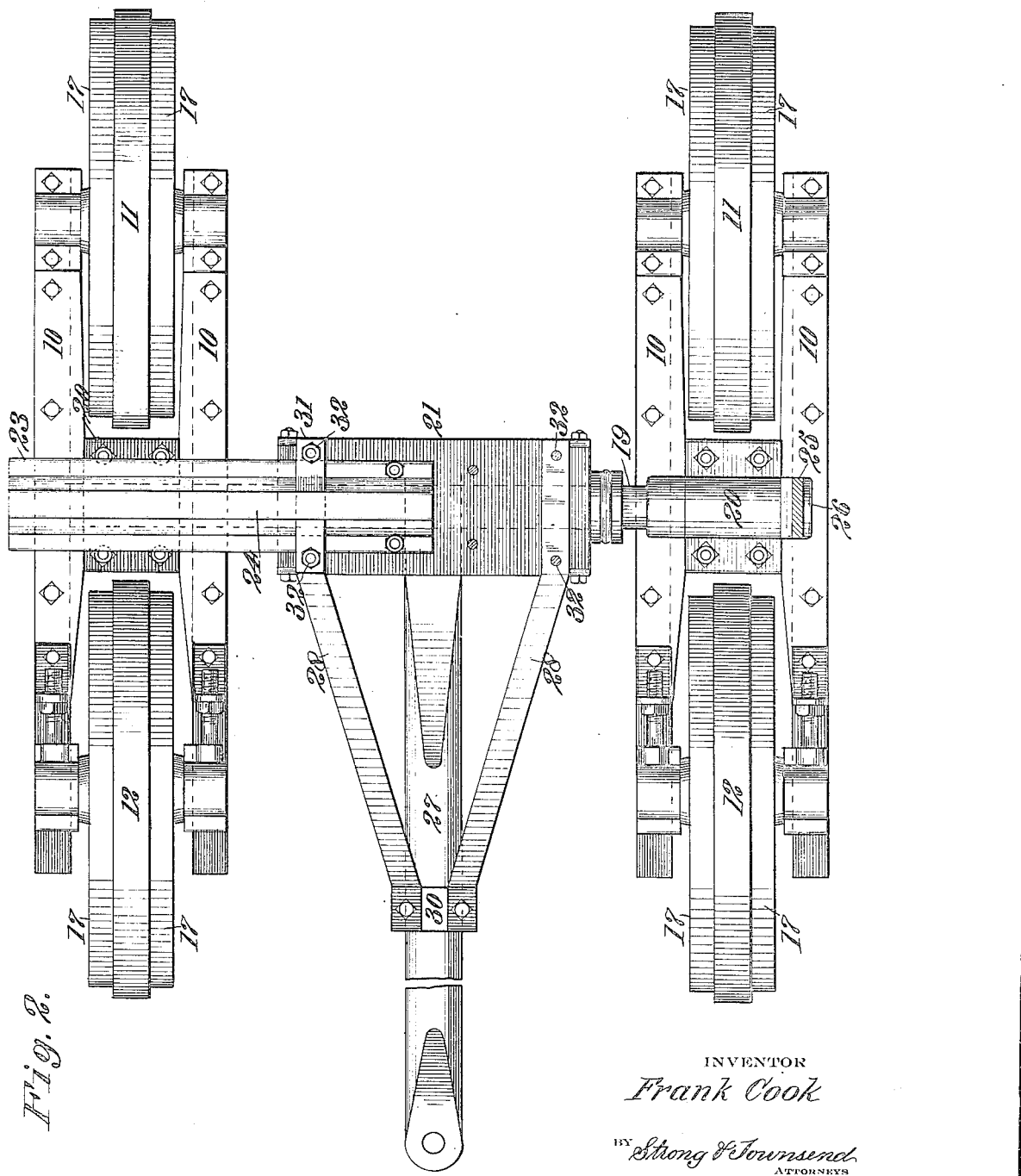
Fig. 2 shows a plan view of the same.
Figure 3:
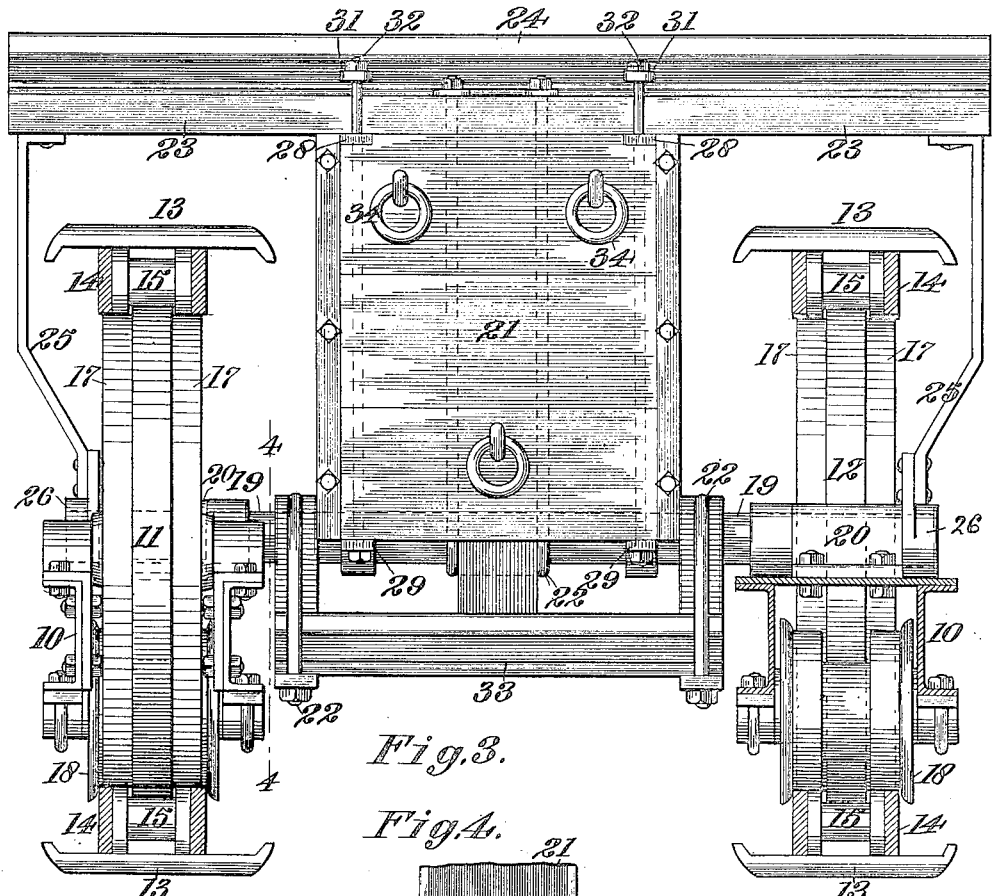
Fig. 3 shows a rear elevation partly in section.
Figure 4:
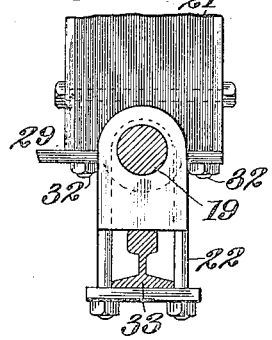
Fig. 4 shows a detailed sectional view taken on a line 4—4 of Fig. 3.

The log hauler in this present form comprises a pair of self-laying track mechanisms arranged side by side and each comprising a rigid truck frame 10 at one end of which is a blank sprocket wheel 11 and at the other end a similar sprocket wheel 12. Over these wheels runs an endless chain track 13 made up of a series of articulated links formed each of a pair of spaced side bars 14 connected together by a gudgeon block 15. Adjacent links are connected together by means of a pin passing through the gudgeon block. The links 14 on their inner longitudinal edges form rail heads on which flanges 17 of the sprocket wheels bear, the rims of the sprocket wheels fitting between the side bars of the links. These sprocket wheels thus help to support the load. One or more bearing rollers 18 is journaled on the truck frame between the sprocket wheels and operates upon the rail heads of the links, thereby supporting the load between the sprocket wheels.

Opposite truck frames are connected together by an axle 19 journaled in bearings 20 on each truck frame. Mounted on the axle between the trucks is a bolster 21 formed preferably of wood and secured in place on the axle by means of bolts 22. This bolster rises above the level of the upper run of the chain tracks and carries on its upper surface a bed-plate 23 carrying a rail 24, both of which project over the upper run of each track and are supported on their ends by standards 25 resting on bearings 26 carried by the projecting ends of the axle 19. A pole 27 is fastened to the middle of the bolster in any suitable manner, this pole being preferably of tubular construction. An upper brace bar 28 is fixed near each end of the bolster and a lower brace bar 29 is fixed to each end of the bolster, preferably passing beneath the axle and serving when clamped in place as a strap for the axle. All of these brace bars extend forwardly and converge at one point where they are fastened to a collar 30 surrounding the pole. For securing the bed-plate and rail in place on top of the bolster, I show clamping plates 31 extending through the rail at points overlying the brace bars. Bolts 32 extend vertically through the bolster and serve to retain the clamping plates and brace bars in position thereon. A rail 33 is preferably arranged beneath the axle in a manner to form a truss.

In the operation of the device, the logs are rolled on to the rail by means of skids. The upper run of the track provides a convenient support for the skids. In case one unit is used, the logs are loaded so that their rear ends drag on the ground. Longer logs may be handled by connecting two units together in tandem and distributing the logs equally on both. The pole is connected in any suitable way to a tractor or to the axle of another like unit. Rings 34 are arranged on the bolster to receive chains whereby the logs are lashed in place. The chain tracks will support as many logs as can be piled on the rail without danger of sinking into the ground and an ordinary tractor can be used successfully for towing the load. Prior devices for hauling logs employ round wheels, and it is almost an impossibility to obtain a wheel of this shape having a large enough supporting area to keep from sinking in the ground such as is encountered under average logging conditions. If these wheels are made large enough in diameter to provide a requisite supporting surface, they then become so high that it is exceedingly difficult to roll the logs over them.

Various changes in the construction and arrangement of the several parts herein shown and described may be employed without departing from the spirit of my invention as disclosed in the appended claims.

Having thus described my invention, what I claim and desire to secure by Letters Patent is:

1. A log hauler comprising a pair of chain track truck mechanisms, an axle connecting opposite trucks together, a bolster on the axle to support the logs, a draft connection serving also to maintain the bolster upright, said bolster rising above the level of the upper run of the tracks, a bed-plate on the bolster projecting over the tracks, and supports for the outer ends of the bed-plate resting on the projecting ends of the axle.

2. A log hauler comprising a pair of chain track truck mechanisms, each consisting of a truck frame fitted with supporting and sprocket wheels, an axle connected to opposite truck frames on a horizontal line with the journal boxes of the sprocket wheels, a bolster fixed on the axle and rising above the upper run of the chain tracks, a bed-plate on the bolster projecting over the tracks to receive the logs, and a draft device connected to the bolster adjacent the axle and brace bars arranged between the bolster and draft bar.

In testimony whereof I have hereunto set my hand in the presence of two subscribing witnesses.

FRANK COOK

Witnesses:
 BEN C. MARZ,
 KATHERINE SCHIBEL.